United States Patent
Du

(10) Patent No.: US 9,424,101 B2
(45) Date of Patent: Aug. 23, 2016

(54) METHOD AND APPARATUS FOR SYNCHRONOUS PROCESSING BASED ON MULTI-CORE SYSTEM

(71) Applicant: Huawei Technologies Co., Ltd., Shenzhen (CN)

(72) Inventor: Xuefeng Du, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 197 days.

(21) Appl. No.: 14/077,421

(22) Filed: Nov. 12, 2013

(65) Prior Publication Data

US 2014/0075449 A1 Mar. 13, 2014

Related U.S. Application Data

(63) Continuation of application No. PCT/CN2011/078411, filed on Aug. 15, 2011.

(51) Int. Cl.
G06F 9/52 (2006.01)
G06F 9/50 (2006.01)
G06F 9/46 (2006.01)

(52) U.S. Cl.
CPC .............. G06F 9/52 (2013.01); G06F 9/5066 (2013.01); G06F 9/522 (2013.01)

(58) Field of Classification Search
None
See application file for complete search history.

(56) References Cited

U.S. PATENT DOCUMENTS

2004/0221246 A1 11/2004 Emerson et al.
2012/0192194 A1* 7/2012 Richardson ............. G06F 9/526
718/103

FOREIGN PATENT DOCUMENTS

| CN | 101114272 A | 1/2008 |
| CN | 101546277 A | 9/2009 |
| CN | 101561766 A | 10/2009 |

OTHER PUBLICATIONS

Foreign Communication From A Counterpart Application, Chinese Application No. 201180001479.5, Chinese Office Action date Oct. 8, 2012, 6 pages.
Foreign Communication From A Counterpart Application, PCT Application No. PCT/CN2011/078411, Chinese Search Report dated Apr. 5, 2012, 7 pages.
Foreign Communication From A Counterpart Application, PCT Application No. PCT/CN2011/078411, Chinese Written Opinion dated Apr. 5, 2012, 4 pages.

* cited by examiner

*Primary Examiner* — Eric C Wai
(74) *Attorney, Agent, or Firm* — Conley Rose, P.C.; Grant Rodolph; Nicholas K. Beaulieu

(57) ABSTRACT

Embodiments of the present invention relate to the field of communications network technologies and provide a method and an apparatus for synchronization processing based on a multi-core system, which can improve efficiency in system scheduling and consume fewer resources. According to the solutions provided in the present invention, an initialization setting is sent by any processing device in a first group of processing devices that synchronously process a same current task and initialization is performed; then a notification message sent by any processing device in the first group of processing devices is received and 1 is subtracted from a value of a counting semaphore; and when the value of the counting semaphore is 0, a control message is sent to a second group of processing devices through a message sending interface. The solutions provided in the present invention are applicable to processing synchronization and communication between multiple modules.

3 Claims, 6 Drawing Sheets

METHOD AND APPARATUS FOR SYNCHRONOUS PROCESSING BASED ON MULTI-CORE SYSTEM

CROSS-REFERENCE TO RELATED APPLICATION

This application is a continuation of International Application No. PCT/CN2011/078411, filed on Aug. 15, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications network technologies, and in particular to a method and an apparatus for synchronous processing based on a multi-core system.

BACKGROUND

As multi-core technologies develop, a system becomes increasingly complex, and interactive events between multiple cores are increasing. In the prior art, processing of synchronization and communication between the multiple cores is typically completed through interrupts.

In the prior art, during processing of event synchronization between the multiple cores, when multiple processors apply for a same mutually exclusive cache inside a semaphore processing unit at the same time, the multiple processors here refer to the multiple cores and the multiple processors and the semaphore processing unit are located on a system on chip (SOC), and the mutually exclusive cache is a caching resource that can only be used by one processor at a certain moment. Typically, the semaphore processing unit sends, through an interrupt and to a processor A among the processors, an identifier for acquiring the caching resource, and after responding to the interrupt and completing event processing, the processor A clears the interrupt. Then, the semaphore processing unit sends the acquisition identifier of the caching resource to another processor through an interrupt.

In the prior art, during processing of message synchronization between the multiple cores, as for that the processor A in the multiple cores applies for a message channel X inside an inter-process communications (IPC) processing unit, after the processor A writes a message onto the message channel X, and the IPC processing unit notifies, through an interrupt, processors other than the processor A which need to acquire the message. In this case, the other processors respond to the interrupt, read the message on the message channel X, and then clear the interrupt.

However, in the prior art, when synchronization and communication between the multiple cores are processed, typically, a synchronization operation needs to be completed through an interrupt, which leads to low efficiency in system scheduling and consumption of considerable resources.

SUMMARY

Embodiments of the present invention provide a method and an apparatus for synchronous processing based on a multi-core system, so as to improve efficiency in system scheduling and consume fewer resources.

To achieve the preceding objectives, the embodiments of the present invention adopt the following technical solutions:

A method for synchronous processing based on a multi-core system includes: receiving an initialization setting sent by any processing device in a first group of processing devices that synchronously process a same current task, and performing initialization, where the initialization setting includes setting a value of a counting semaphore of a current multi-core synchronous processing unit to M and setting content of a control message for the current multi-core synchronous processing unit to enable a second group of processing devices, and M is the number of times that the first group of processing devices synchronously process the current task; receiving a notification message sent by any processing device in the first group of processing devices, and subtracting 1 accordingly from the value of the counting semaphore, where content of the notification message is that a processing device sending the notification message completes the current task; and when the value of the counting semaphore is 0, sending the control message to the second group of processing devices through a message sending interface according to the set content of the control message for the current multi-core synchronous processing unit to enable the second group of processing devices, so that the second group of processing devices processes the current task.

An apparatus for synchronous processing based on a multi-core system includes: an initializing module configured to receive an initialization setting sent by any processing device in a first group of processing devices that synchronously process a same current task, and perform initialization, where the initialization setting includes setting a value of a counting semaphore of a current multi-core synchronous processing unit to M and setting content of a control message for the current multi-core synchronous processing unit to enable a second group of processing devices, and M is the number of times that the first group of processing devices synchronously process the current task; a processing module configured to receive a notification message sent by any processing device in the first group of processing devices, and subtract 1 accordingly from the value of the counting semaphore, where content of the notification message is that a processing device sending the notification message completes the current task; and a sending module configured to, when the value of the counting semaphore is 0, send the control message to the second group of processing devices through a message sending interface according to the set content of the control message for the current multi-core synchronous processing unit to enable the second group of processing devices, so that the second group of processing devices processes the current task.

According to the method and the apparatus for synchronous processing based on a multi-core system that are provided in the embodiments of the present invention, an initialization setting is sent by any processing device in a first group of processing devices that synchronously process a same current task, and initialization is performed; then a notification message sent by any processing device in the first group of processing devices is received, and 1 is subtracted accordingly from a value of the counting semaphore; and when the value of the counting semaphore is 0, the control message is sent to a second group of processing devices through a message sending interface according to content of the control message for the multi-core synchronous processing unit to enable the second group of processing devices, so that the second group of processing devices processes the current task. Compared with the prior art where a synchronization operation needs to be completed through an interrupt when synchronization and communication between multiple cores are processed, thereby leading to low efficiency in system scheduling and consumption of considerable resources, the embodiments of the present invention provide solutions where synchronization and communication between multiple processing devices are processed by sending a control message, which can improve efficiency in system scheduling and consume fewer resources.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
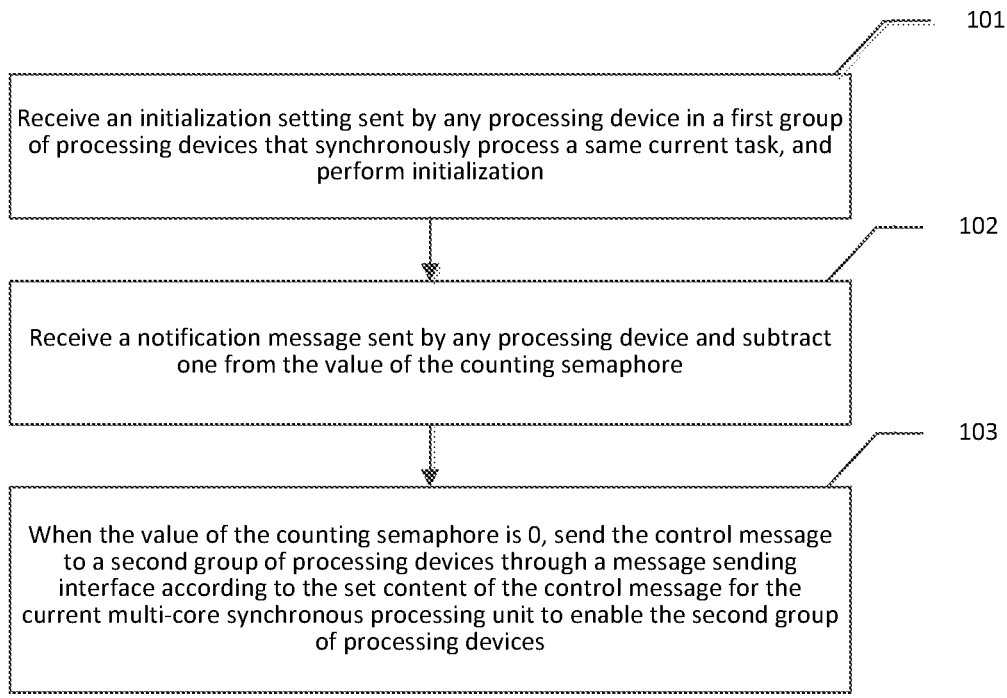
FIG. 1 is a flowchart of a method for synchronous processing based on a multi-core system according to Embodiment 1 of the present invention.

An embodiment of the present invention provides a method for synchronous processing based on a multi-core system. It should be noted that the multi-core system, in the embodiment of the present invention, refers to a system in which multiple processing devices exist. As shown in FIG. 1, the method includes:

Step 101: Receive an initialization setting sent by any processing device in a first group of processing devices that synchronously process a same current task, and perform initialization, where the initialization setting includes setting a value of a counting semaphore of a current multi-core synchronous processing unit to M and setting content of a control message for the current multi-core synchronous processing unit to enable a second group of processing devices, and M is the number of times that the first group of processing devices synchronously process the current task.

A processing device may be a processor, and may also be an accelerator. An accelerator may independently process a task, and may also assist a processor in completing calculation processing, thereby accelerating the speed of the processor during task processing.

Specifically, the initialization setting sent by any processing device in the first group of processing devices that synchronously process the same current task is received through any channel of an internal cache; and the internal cache corresponding to the channel is read, content in the internal cache is updated to the initialization setting, and the initialization setting is saved.

Step 102: Receive a notification message sent by any processing device in the first group of processing devices, and subtract 1 accordingly from the value of the counting semaphore, where content of the notification message is that a processing device sending the notification message completes the current task; and further, receive, through any channel of the internal cache, the notification message sent by any processing device in the first group of processing devices; read the internal cache corresponding to the channel, and acquire a current value of the counting semaphore in the internal cache; and subtract 1 from the current value of the counting semaphore, and save the current value of the counting semaphore in the internal cache.

Step 103: When the value of the counting semaphore is 0, send the control message to the second group of processing devices through a message sending interface according to the set content of the control message for the current multi-core synchronous processing unit to enable the second group of processing devices, so that the second group of processing devices processes the current task.

According to the method for synchronous processing based on a multi-core system provided in the embodiment of the present invention, an initialization setting is sent by any processing device in a first group of processing devices that synchronously process a same current task, and initialization is performed; then a notification message sent by any processing device in the first group of processing devices is received, and 1 is subtracted accordingly from a value of the counting semaphore; and when the value of the counting semaphore is 0, the control message is sent to a second group of processing devices through a message sending interface according to content of the control message for the multi-core synchronous processing unit to enable the second group of processing devices, so that the second group of processing devices processes the current task. Compared with the prior art where a synchronization operation needs to be completed through an interrupt when synchronization and communication between multiple cores are processed, thereby leading to low efficiency in system scheduling and consumption of considerable resources, the embodiment of the present invention provides a solution where synchronization and communication between multiple processing devices are processed by sending a control message, which can improve efficiency in system scheduling and consume fewer resources.

Figure 2:
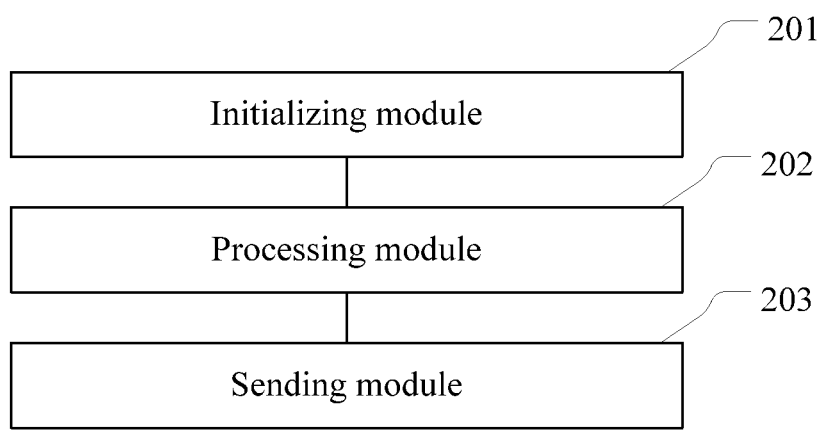
FIG. 2 is a block diagram of an apparatus for synchronous processing based on a multi-core system according to Embodiment 1 of the present invention.

The embodiment of the present invention provides an apparatus for synchronous processing based on a multi-core system. Specifically, the apparatus is a multi-core synchronous processing unit. As shown in FIG. 2, the apparatus includes: an initializing module 201, a processing module 202, and a sending module 203.

The initializing module 201 is configured to receive an initialization setting sent by any processing device in a first group of processing devices that synchronously process a same current task, and perform initialization, where the initialization setting includes setting a value of a counting semaphore of a current multi-core synchronous processing unit to M and setting content of a control message for the current multi-core synchronous processing unit to enable a second group of processing devices, and M is the number of times that the first group of processing devices synchronously process the current task.

The initializing module 201 includes a first receiving submodule and an updating and storage submodule. The first receiving submodule is configured to receive, through any channel of an internal cache, the initialization setting sent by any processing device in the first group of processing devices that synchronously process the same current task; and the updating and storage submodule is configured to read the internal cache corresponding to the channel, update content in the internal cache to the initialization setting, and save the initialization setting.

The processing module 202 is configured to receive a notification message sent by any processing device in the first group of processing devices, and subtract 1 accordingly from the value of the counting semaphore, where content of the notification message is that a processing device sending the notification message completes the current task.

The processing module 202 includes a second receiving submodule, an acquiring submodule, and an updating submodule. The second receiving submodule is configured to receive, through any channel of the internal cache, the notification message sent by any processing device in the first group of processing devices; the acquiring submodule is configured to read the internal cache corresponding to the channel and acquire a current value of the counting semaphore in the internal cache; and the updating submodule is configured to subtract 1 from the current value of the counting semaphore and save the current value of the counting semaphore in the internal cache.

The sending module 203 is configured to, when the value of the counting semaphore is 0, send the control message to the second group of processing devices through a message sending interface according to the set content of the control message for the current multi-core synchronous processing unit to enable the second group of processing devices, so that the second group of processing devices processes the current task.

According to the apparatus for synchronous processing based on a multi-core system provided in the embodiment of the present invention, when each of the processing devices that synchronously process a same current task processes and completes the current task, a processing module subtracts 1 from a value of a counting semaphore, and then, when the value of the counting semaphore is 0, a sending module sends a response message to a second group of processing devices, so that the second group of processing devices processes the current task. Compared with the prior art where a synchronization operation needs to be completed through an interrupt when synchronization and communication between multiple cores are processed, thereby leading to low efficiency in system scheduling and consumption of considerable resources, the embodiment of the present invention provides a solution where synchronization and communication between multiple processing devices are processed by sending a response control message, which can improve efficiency in system scheduling and consume fewer resources.

Embodiment 2

Figure 3:
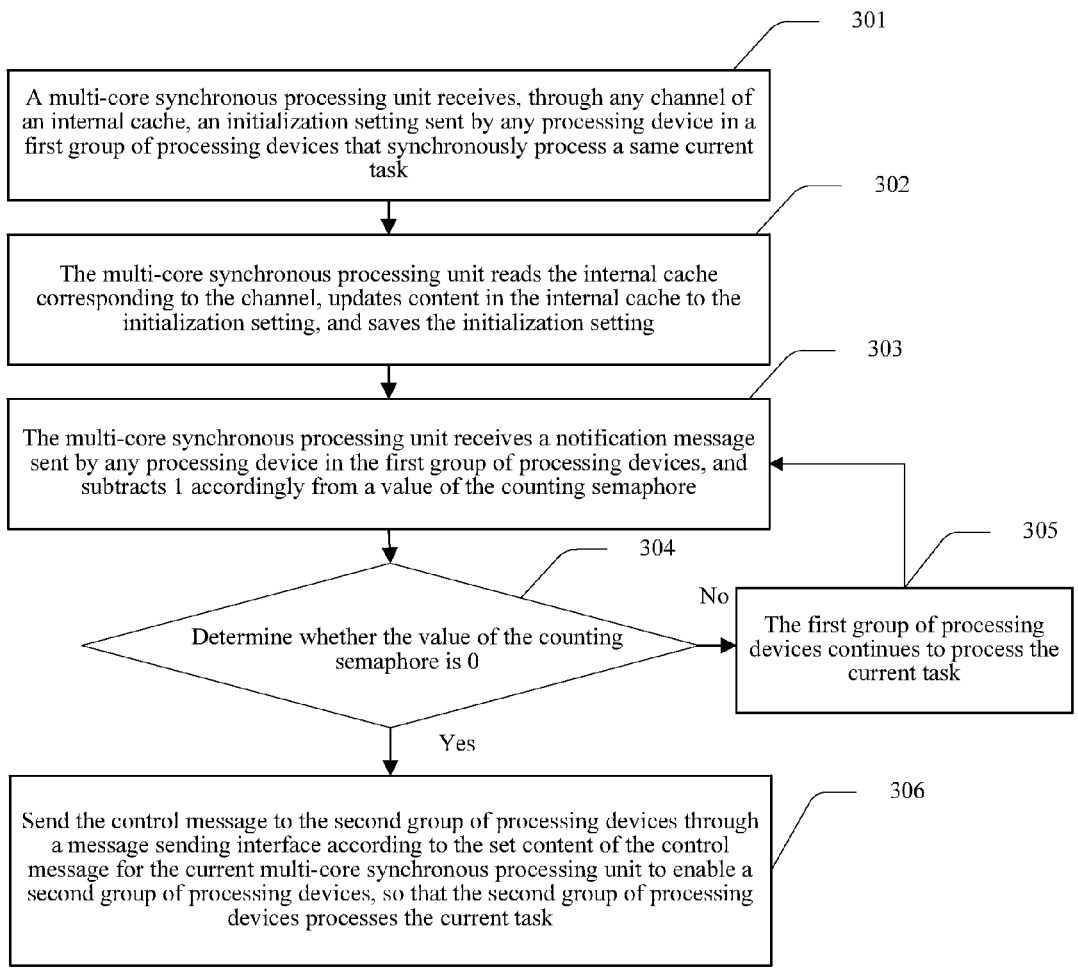
FIG. 3 is a flowchart of a method for synchronous processing based on a multi-core system according to Embodiment 2 of the present invention.

It should be noted that an embodiment of the present invention provides a method for synchronous processing based on a multi-core system, of which an application scenario is that: each processing device in a first group of processing devices that synchronously process a same current task needs to process a part of the current task, and when the current task is completed, a control message is sent to notify a second group of processing devices of processing the current task. A processing device includes a processor or an accelerator. A current task may be completed by a processor and may also be completed by an accelerator. The embodiment of the present invention describes the method for synchronous processing based on the multi-core system by taking a procedure for processing the current task as an example. As shown in FIG. 3, the method includes:

Step 301: A multi-core synchronous processing unit receives, through any channel of an internal cache, an initialization setting sent by any processing device in a first group of processing devices that synchronously process a same current task, where the initialization setting includes setting a value of a counting semaphore of the current multi-core synchronous processing unit to M and setting content of a control message for the current multi-core synchronous processing unit to enable a second group of processing devices, and M is the number of times that the first group of processing devices synchronously process the current task.

Here, a semaphore is a non-negative integer count, the semaphore is used to coordinate access to a resource, and its initial value is the quantity of available resources. That is, an application value M of a counting semaphore is the quantity of available resources. In the present invention, each processor in the first group of processors that synchronously process the same current task needs to occupy one resource when processing the current task, the first group of processors synchronously process the same current task for M times, and therefore, a total of M resources need to be occupied.

Specifically, the initialization setting is carried in an application message. The application message that carries the initialization setting may be sent through multiple channels. In addition, the application message further carries an application identifier. The application identifier is used to identify a resource that is in an internal cache and is obtained in this time of application, thereby avoiding repeated application of the resource.

Step 302: The multi-core synchronous processing unit reads the internal cache corresponding to the channel, updates content in the internal cache to the initialization setting, and saves the initialization setting.

It should be noted that, after the internal cache corresponding to the channel is read, it may further be checked whether an exception exists, specifically, it is checked whether the initialization setting is repeated, whether unauthorized application for the initialization setting exists, and so on.

It should be noted that Step 301 and Step 302 are in a procedure where the multi-core synchronous processing unit receives the initialization setting sent by any processing device in the first group of processing devices that synchronously process the same current task and performs initialization, and specifically, the procedure is executed by a semaphore threshold counting unit inside the multi-core synchronous processing unit, where the semaphore threshold counting unit receives, through a configuration interface, an application message that carries the initialization setting, and the configuration interface is disposed on the multi-core synchronous processing unit.

In addition, the semaphore threshold counting unit is integrated into the multi-core synchronous processing unit. The multi-core synchronous processing unit further includes a semaphore direct acquiring unit, a semaphore indirect acquiring unit, and a message sending unit. The semaphore direct acquiring unit is configured to directly send an acquisition identifier to a processing device that acquires a semaphore; the semaphore indirect acquiring unit is configured to send an acquisition identifier to a processing device by sending a message or sending an interrupt; the message sending unit is configured to send a control message or a notification message to a processing device through a message sending interface; and the semaphore threshold counting unit is configured to control counting semaphores acquired by processing devices concurrently accessing the multi-core synchronous processing unit.

Figure 4:
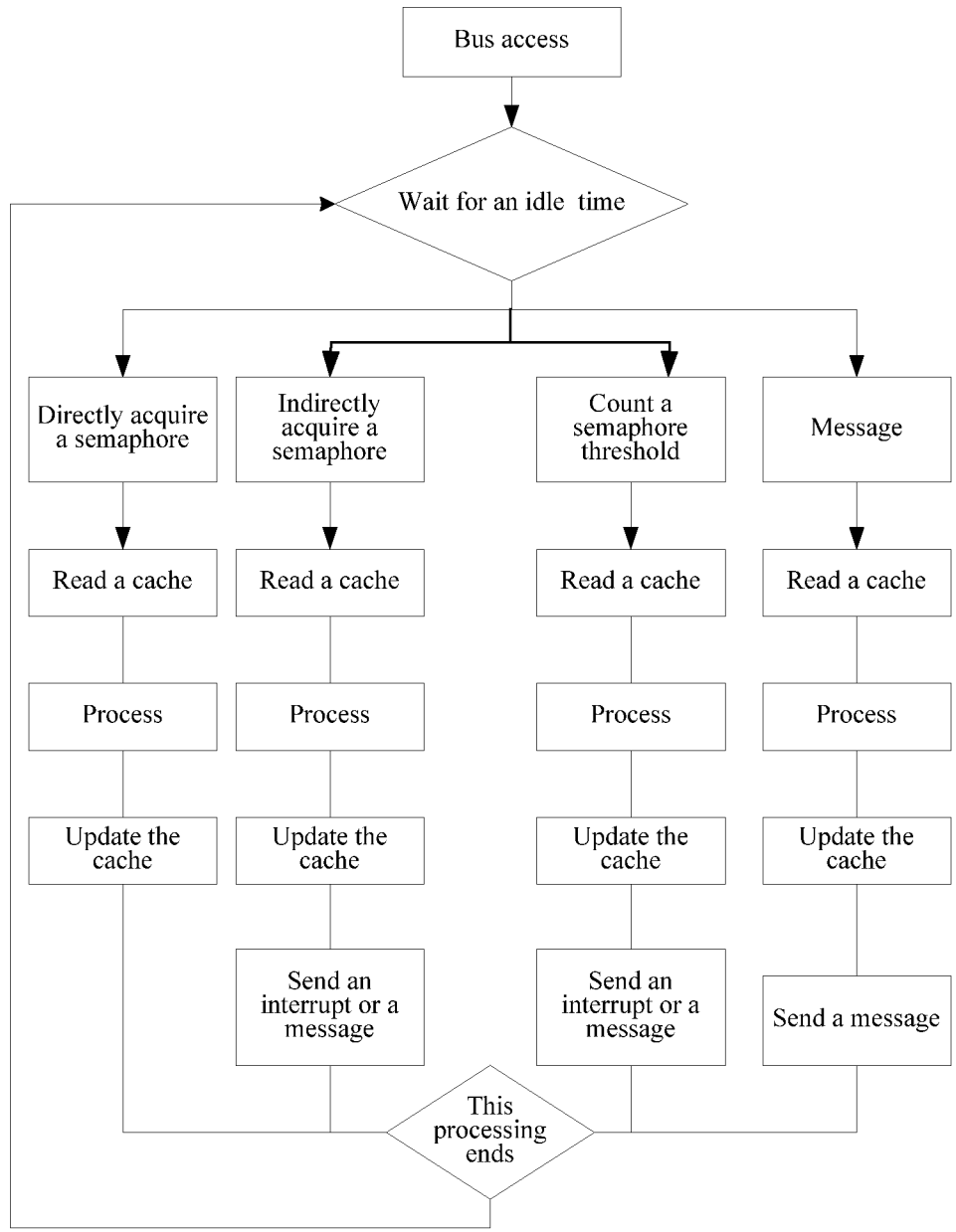
FIG. 4 is a schematic diagram of independent processing of each synchronous processing unit according to Embodiment 2 of the present invention.

In the schematic diagram shown in FIG. 4, a processing procedure of the semaphore direct acquiring unit, the semaphore indirect acquiring unit, and the message sending unit is similar to that of the semaphore threshold counting unit, where after receiving a new initialization setting, the semaphore direct acquiring unit, the semaphore indirect acquiring unit, and the message sending unit read an internal cache, check whether an exception such as repeated application or unauthorized application exists in the internal cache, then update content in the internal cache to content of an initialization setting, and save the content of the initialization setting. It should be noted that the semaphore indirect acquiring unit, the semaphore threshold counting unit, and the message sending unit further need to send a message or an interrupt so as to notify the multi-core synchronous processing unit that this task is completed.

Compared with the prior art where message transmission between an accelerator and a processor can only be completed through an interrupt, the embodiment of the present invention provides a solution where a semaphore threshold counting unit and a message sending unit are added, and in this way mutual message transmission between an accelerator and a processor may be effectively implemented, so that fewer resources are consumed.

For the purpose of implementing independent access of each of the units in the multi-core synchronous processing unit, access traffic of a bus may be controlled through a bus configuration interface. As shown in FIG. 4, specifically, before one bus access ends, a subsequent operation of the bus is controlled by a bus interface, and each operation of the bus corresponds to one operation of accessing, processing, and updating of the internal cache. In this way, a rapid collision-free synchronous scheduling mechanism may be implemented for multi-core synchronous processing units.

After a resource is obtained through application and the multi-core synchronous processing unit is initialized, each processing device may process a corresponding task. Step 303: The multi-core synchronous processing unit receives a notification message sent by any processing device in the first group of processing devices, and subtracts 1 accordingly from the value of the counting semaphore, where content of the notification message is that a processing device sending the notification message completes the current task.

Processing devices in the first group of processing devices occupy, according to a sequence of tasks in a task list, resources corresponding to the counting semaphore to process a task, every time when a processing device in the first group of processing devices completes the current task, the multi-core synchronous processing unit performs an operation of releasing a semaphore corresponding to the current task, that is, subtracting 1 accordingly from the value of the counting semaphore.

Specifically, the internal cache is read through any channel of the internal cache, a current value of the counting semaphore in the internal cache is acquired, and it is checked whether an exception exists; and then, when the current value of the counting semaphore in the internal cache is acquired, 1 is subtracted from the current value of the counting semaphore, and saves the current value of the counting semaphore in the internal cache.

Figure 5:
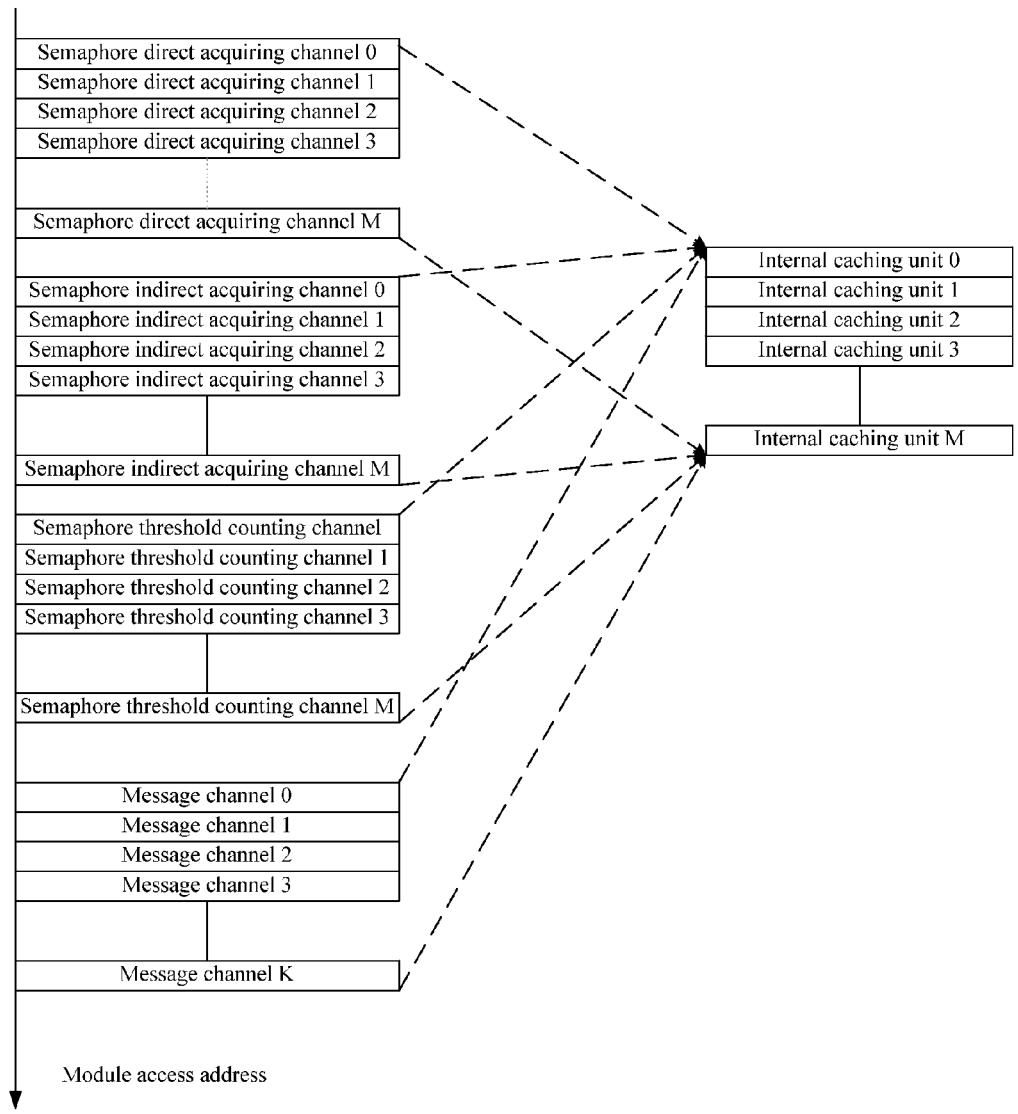
FIG. 5 is a schematic diagram of a mapping of virtual addresses according to Embodiment 2 of the present invention.

The internal cache may be read through multiple channels, and the semaphore direct acquiring unit, the semaphore indirect acquiring unit, the message sending unit, and the semaphore threshold counting unit on the multi-core synchronous processing unit access the internal cache by using multiple channels, as shown in a schematic diagram of a mapping of virtual addresses in FIG. 5. The multi-channel access is that access of each synchronizing unit is mapped into a same internal cache through a different address. Compared with the prior art where a semaphore processing unit and an IPC unit are two independent units and cannot effectively share a channel cache, the embodiment of the present invention provides a solution where an internal cache can be shared to the greatest extent and internal caching resources are saved. Further, the internal cache may be replaced with a register that provides relatively few resources, and the number of channels can be increased as large as possible, thereby effectively reducing a probability of competition between multiple cores.

In addition, as for sharing of the channel cache, given that there are 10 channels: in the prior art, it may be set through software that certain channels of the 10 channels can implement functions A, B, C, and D, for example, it is set that 4 channels can implement the function A, it is set that 2 channels can implement the function B, it is set that 2 channels can implement the function C, and it is set that 2 channels can implement the function D; and according to the solutions provided in the embodiment of the present invention, all of the 10 channels can implement the functions A, B, C, and D, and in this way, each channel may be allocated more flexibly to implement a corresponding function.

Step 304: Determine whether the value of the counting semaphore is 0.

Specifically, determine whether the current value of the counting semaphore in the internal cache is 0.

Step 305: When the value of the counting semaphore is not 0, the first group of processing devices continues to process the current task.

If the value of the counting semaphore is not 0, which indicates that the current task that needs to be processed has not been completed, a processing device that is in the first group of processing devices and has not completed the current task continues to occupy a resource corresponding to the counting semaphore to process the current task, then executes Step 303, and when a certain processing device in the first group of processing devices completes the current task, subtracts 1 from the value of the counting semaphore, and determines whether the current value of the counting semaphore is 0.

Step 306: When the value of the counting semaphore is 0, send the control message to the second group of processing devices through a message sending interface according to the set content of the control message for the current multi-core synchronous processing unit to enable the second group of processing devices, so that the second group of processing devices processes the current task.

It should be noted that the control message has been initially set in an application message sent by any processing device in the first group of processing devices that synchronously process the same current task in Step 301. Here, when the value of the counting semaphore is 0, it is indicated that the first group of processing devices has completed the current task allocated to each processing device. In this case, the first group of processing devices starts to process a second task. A procedure for processing the second task is the same as that for processing the current task.

Figure 6:
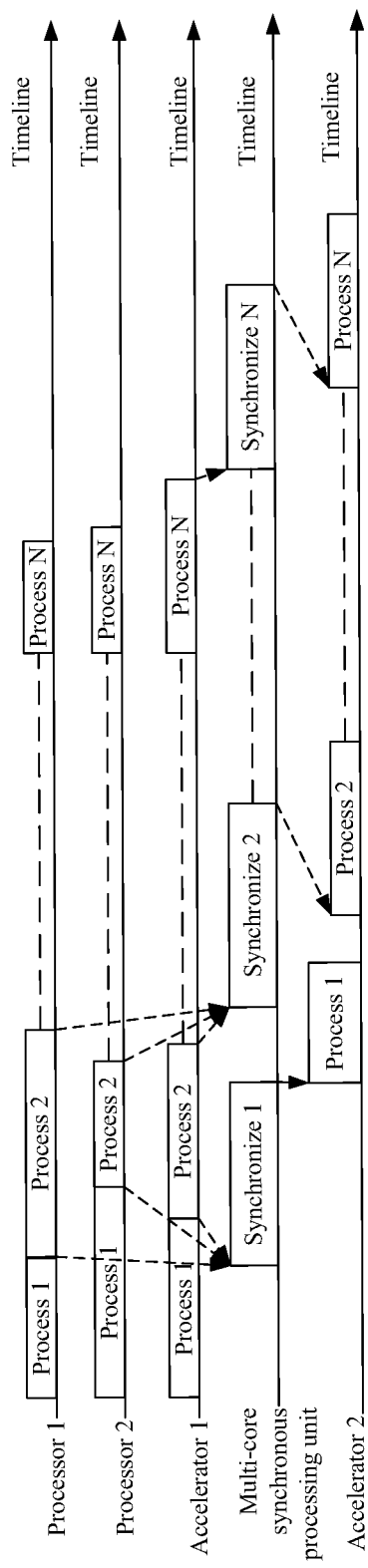
FIG. 6 is a schematic diagram of processing, by a processing device, a task according to Embodiment 2 of the present invention.

In a schematic diagram of processing each task shown in FIG. 6, a first group of processing devices includes a processor 1, a processor 2, and an accelerator 1, and a second group of processing devices includes an accelerator 2, where the processor 1 processes part A of a current task, the processor 2 processes part B of the current task, the accelerator 1 processes part C of the current task, and the accelerator 2 processes part D of the current task; the processor 1 spends the shortest time in completing part A of the task, the processor 2 spends the longest time in completing part B of the task, and when the processor 2 completes part B of the task, the processor 1 and the accelerator 1 have completed the corresponding task; and in this case, a value of a counting semaphore of a multi-core synchronous processing unit has decreased to 0, and the multi-core synchronous processing unit sends a control message to the accelerator 2, so that the accelerator 2 will process part D of the task. After completing the task, the processor 1, the processor 2, and accelerator 1 continue to execute another task.

For example, a frequency band in wireless communications bears multiple channel types, after multiple channels are separated, different units need to perform subsequent processing, for example: after an accelerator A completes a current task, the multi-core synchronous processing unit delivers a control message to different addresses so as to enable an accelerator B and an accelerator C as well as notify a processor D of processing the current task. Compared with the prior art where, after completing the current task, the accelerator A notifies the processor D through an interrupt, then the processor D enables the accelerator B and the accelerator C through an interrupt, and if N tasks need to be processed, the interrupt needs to be responded for at least 3N times, the embodiment of the present invention provides a solution where system overhead can be effectively reduced, and especially when a processing unit after synchronization is an accelerator, the embodiment of the present invention provides a solution where no interrupt needs to be responded.

It should be noted that, if a processing device in the second group is an accelerator and, in Step 306, the multi-core synchronous processing unit sends a control message to the accelerator in the second group, it does not need to send an interrupt to the accelerator in the second group; and if a processing device in the second group is a processor and, in Step 306, the multi-core synchronous processing unit sends a control message to the processor, it may or may not send an interrupt to the processor in the second group.

Specifically, if an interrupt is sent to a processor in the second group, specifically, through an interrupt output interface, where the interrupt output interface is disposed on the multi-core synchronous processing unit and is used for combined notification of multiple control messages, and in this way, sending of an interrupt notification can be reduced and resource consumption can be reduced.

Further, the second group of processing devices receives a response message sent by the multi-core synchronous processing unit and processes the current task.

It should be noted that if an interrupt is also received, the interrupt needs to be processed. When all processing devices need to process N tasks, because the time that each processing device spends in processing a task is uncertain, if a certain processor in the second group of processing devices processes the task rather slowly, the interrupt needs to be responded for only once during a process for processing all the tasks; and if a certain processor in the second group of processing devices processes the task rather quickly, the interrupt needs to be responded for N times at most in a process of processing all the tasks, and in this way, overheads of a system in responding to the interrupt are effectively reduced.

In addition, in the prior art, when a scheduling processor is used to process synchronization, a scheduling speed of the scheduling processor is limited, scheduling efficiency is rather low, and a requirement for high-speed service processing cannot be satisfied. For example, a service period of wireless communications is in millisecond magnitude, a processing period of the scheduling processor is in microsecond magnitude, and when a same service is processed, the scheduling processor needs to be scheduled for several hundred times. The embodiment of the present invention provides a solution where a multi-core synchronous processing unit is used to process synchronization, and synchronously scheduling multiple processing devices in a speedy manner may be implemented, which can improve scheduling efficiency and save processing time.

According to the method for synchronous processing based on a multi-core system provided in the embodiment of the present invention, a value of a counting semaphore is reduced to 0 when each of the processing devices that synchronously process a same current task completes the current task, and then a multi-core synchronous processing unit sends a response message to a second group of processing devices so as to notify the second group of processing devices of processing the current task. Compared with the prior art where a synchronization operation needs to be completed through an interrupt when synchronization and communication between multiple cores are processed, thereby leading to low efficiency in system scheduling and consumption of considerable resources, the embodiment of the present invention provides a solution where synchronization and communication between multiple processing devices are processed by sending a control message, which can improve efficiency in system scheduling, reduce system overhead, and consume fewer resources.

Figure 7:
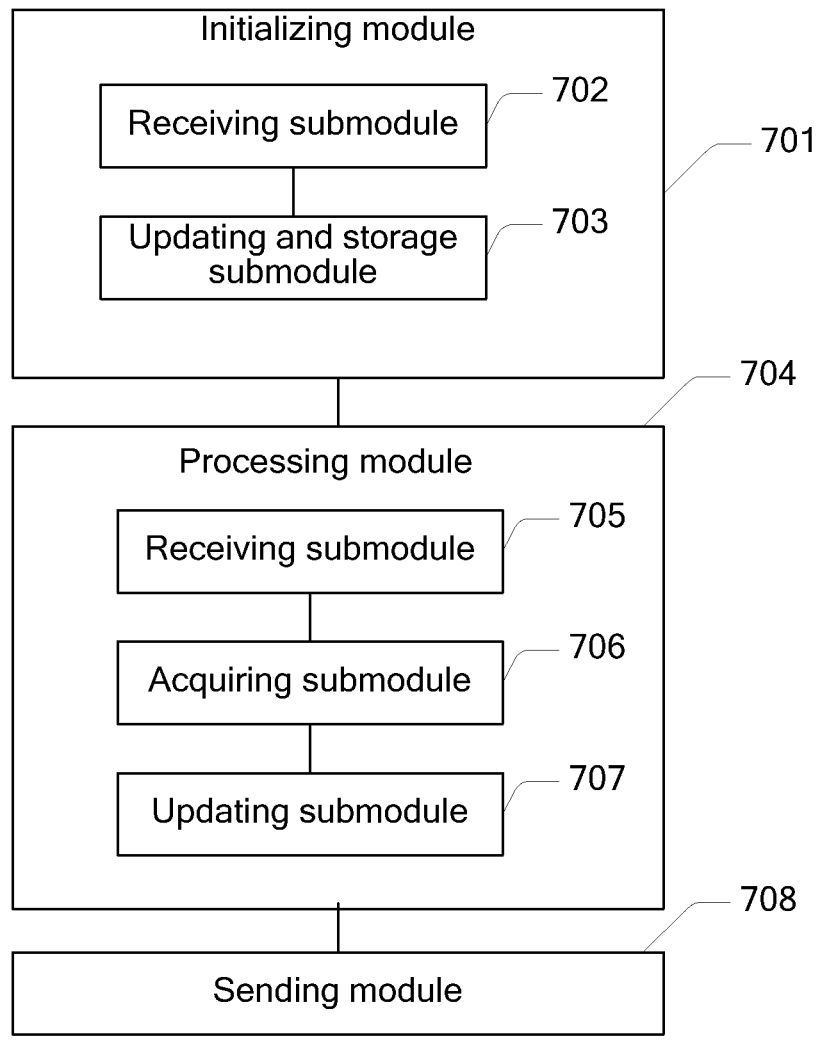
FIG. 7 is a block diagram of an apparatus for synchronous processing based on a multi-core system according to Embodiment 2 of the present invention.

The embodiment of the present invention provides an apparatus for synchronous processing based on a multi-core system. The apparatus may be a multi-core synchronous processing unit, and the multi-core synchronous processing unit is located on a SOC. As shown in FIG. 7, the apparatus includes: an initializing module 701, a first receiving submodule 702, an updating and storage submodule 703, a processing module 704, a second receiving submodule 705, an acquiring submodule 706, an updating submodule 707, and a sending module 708.

The initializing module 701 is configured to receive an initialization setting sent by any processing device in a first group of processing devices that synchronously process a same current task, and perform initialization, where the initialization setting includes setting a value of a counting semaphore of a current multi-core synchronous processing unit to M and setting content of a control message for the current multi-core synchronous processing unit to enable a second group of processing devices, and M is the number of times that the first group of processing devices synchronously process the current task.

A processing device is a processor or an accelerator. A current task may be completed by a processor and may also be completed by an accelerator.

An application value M of a counting semaphore is the quantity of available resources. In the present invention, each processing device in the first group of processing devices that synchronously process a same current task needs to occupy one resource when processing the current task, the first group of processing devices synchronously process the same current task for M times, and therefore, a total of M resources need to be occupied.

Specifically, the first receiving submodule 702 in the initializing module 701 is configured to receive, through any channel of an internal cache, the initialization setting sent by any processing device in the first group of processing devices that synchronously process the same current task.

The initialization setting is carried in an application message and sent. The application message that carries the initialization setting may be sent through multiple channels. In addition, the application message further carries an application identifier. The application identifier is used to identify a resource that is in an internal cache and obtained in this time of application, thereby avoiding repeated application of the resource.

The updating and storage submodule 703 is configured to read the internal cache corresponding to the channel, update content in the internal cache to the initialization setting, and save the initialization setting.

It should be noted that, after the internal cache corresponding to the channel is read, it further needs to be checked whether an exception exists, specifically, it is checked whether the initialization setting is repeated, whether unauthorized application for the initialization setting exists, and so on.

The processing module 704 is configured to receive a notification message sent by any processing device in the first group of processing devices, and subtract 1 accordingly from the value of the counting semaphore, where content of the notification message is that a processing device sending the notification message completes the current task.

Specifically, the second receiving submodule 705 in the processing module 704 is configured to receive, through any channel of the internal cache, the notification message sent by any processing device in the first group of processing devices.

The notification message further includes releasing an identifier of a counting semaphore, that is, releasing the application identifier carried in the application message, for a next time of use of the released resources.

The acquiring submodule 706 is configured to read the internal cache corresponding to the channel and acquire a current value of the counting semaphore in the internal cache.

It should be noted that, when the current value of the counting semaphore in the internal cache is acquired, a semaphore threshold counting unit may read the internal cache through multiple channels, and a semaphore direct acquiring unit, a semaphore indirect acquiring unit, a message sending unit, and the semaphore threshold counting unit in the multi-core synchronous processing unit adopt multi-channel access. The multi-channel access is that access of each synchronizing unit is mapped into a same internal cache by using a different address, which may implement sharing of the internal cache to the greatest extent and save internal caching resources. Further, the internal cache may be replaced with a register that provides relatively few resources, and the number of channels can be increased as large as possible, thereby effectively reducing a probability of competition between multiple cores.

In addition, the semaphore direct acquiring unit is configured to directly send an acquisition identifier to a processing device that acquires a semaphore; the semaphore indirect acquiring unit is configured to send an acquisition identifier to a processing device by sending a message or sending an interrupt; the message sending unit is configured to send a control message or a notification message to a processing device through a message sending interface; and the semaphore threshold counting unit is configured to control counting semaphores acquired by processing devices concurrently accessing the multi-core synchronous processing unit. Specifically, after receiving a new initialization setting, the semaphore direct acquiring unit, the semaphore indirect acquiring unit, and the message sending unit read the internal cache, check whether an exception such as repeated application or unauthorized application exists in the internal cache, then update content in the internal cache into content of the initialization setting, and save the content of the initialization setting.

The updating submodule 707 is configured to subtract 1 from the current value of the counting semaphore and save the current value of the counting semaphore in the internal cache; and in this case, determine whether the current value of the counting semaphore in the internal cache is 0, where when the value of the counting semaphore is not 0, the first group of processing devices continues to process the current task.

The sending module 708 is configured to, when the value of the counting semaphore is 0, send the control message to the second group of processing devices through a message sending interface according to the set content of the control message for the current multi-core synchronous processing unit to enable the second group of processing devices, so that the second group of processing devices processes the current task.

It should be noted that in the prior art, there is no sending module, that is, a response message cannot be sent, and communication between synchronizing units can only be performed through an interrupt. The embodiment of the present invention provides a solution where a sending module is added, and a synchronization event from a synchronizing unit is converted into message sending, thereby implementing mutual synchronization and communication between multiple processors and accelerators.

The control message is sent to the second group of processing devices through a message sending interface. The message sending interface is disposed on the multi-core synchronous processing unit.

It should be noted that, if the sending module sends the control message to an accelerator, an interrupt does not need to be sent to the second group of processing devices, and if the sending module sends the control message to a processor, an interrupt may or may not be sent to the second group of processing devices.

Specifically, if an interrupt is sent to a processor in the second group, specifically, through an interrupt output interface, where the interrupt output interface is disposed on the multi-core synchronous processing unit and is used for combined notification of multiple control messages, and in this way, sending of an interrupt notification can be reduced and resource consumption can be reduced.

In addition, when all processing devices need to process N tasks, because the time that each processing device spends in processing a task is uncertain, if a certain processor in the second group of processing devices processes the task rather slowly, the interrupt needs to be responded for only once during a process for processing all the tasks; and if a certain processor in the second group of processing devices processes the task rather quickly, the interrupt needs to be responded for N times at most in a process of processing all the tasks, and in this way, overheads of a system in responding to the interrupt are effectively reduced.

For example, a frequency band in wireless communications bears multiple channel types, after multiple channels are separated, different units need to perform subsequent processing, for example: after an accelerator A completes a current task, the multi-core synchronous processing unit delivers a control message to different addresses so as to enable an accelerator B and an accelerator C as well as notify a processor D of processing the current task. Compared with the prior art where, after completing the current task, the accelerator A notifies the processor D through an interrupt, then the processor D enables the accelerator B and the accelerator C through an interrupt, and if N tasks need to be processed, the interrupt needs to be responded for at least 3N times, the embodiment of the present invention provides a solution where system overhead can be effectively reduced, and especially when a processing unit after synchronization is an accelerator, the embodiment of the present invention provides a solution where no interrupt needs to be responded.

According to the apparatus for synchronous processing based on a multi-core system provided in the embodiment of the present invention, when each of processing devices that synchronously process a same current task processes and completes the current task, a processing unit subtracts 1 from a value of a counting semaphore, and then, when the value of the counting semaphore is 0, a sending module sends a control message to a multi-core synchronous processing unit, so as to notify the second group of processing devices of processing the current task. Compared with the prior art where a synchronization operation needs to be completed through an interrupt when synchronization and communication between multiple cores are processed, thereby leading to low efficiency in system scheduling and consumption of considerable resources, the embodiment of the present invention provides a solution where synchronization and communication between multiple cores are processed by sending a response message, which can improve efficiency in system scheduling, reduce system overhead, and consume fewer resources.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for synchronous processing based on a multi-core system, comprising:
   receiving an initialization setting sent by any processing device in a first group of processing devices that synchronously process a same current task;
   performing initialization, wherein the initialization setting comprises setting a value of a counting semaphore of a current multi-core synchronous processing unit to M and setting content of a control message for the current multi-core synchronous processing unit to enable a second group of processing devices, and wherein M is the number of times that the first group of processing devices synchronously process the current task;
   receiving a notification message sent by any processing device in the first group of processing devices;
   subtracting one accordingly from the value of the counting semaphore, wherein content of the notification message is that a processing device sending the notification message completes the current task; and
   when the value of the counting semaphore is zero, sending the control message to the second group of processing devices through a message sending interface according to the set content of the control message for the current multi-core synchronous processing unit to enable the second group of processing devices such that the second group of processing devices processes the current task,
   wherein receiving the initialization setting sent by any processing device in the first group of processing devices that synchronously process the same current task comprises receiving, through any channel of an internal cache, the initialization setting sent by any processing device in the first group of processing devices that synchronously process the same current task,
   wherein performing initialization comprises reading the internal cache corresponding to the channel, updating content in the internal cache to the initialization setting, and saving the initialization setting, and
   wherein receiving the notification message sent by any processing device in the first group of processing devices and subtracting one accordingly from the value of the counting semaphore comprises:
      receiving, any channel of the internal cache, the notification message sent by any processing device in the first group of processing devices;
      reading the internal cache corresponding to the channel and acquiring a current value of the counting semaphore in the internal cache; and
      subtracting one from the current value of the counting semaphore and saving the current value of the counting semaphore in the internal cache.

2. An apparatus for synchronous processing based on a multi-core system, comprising:
   an initializing module configured to receive an initialization setting sent by any processing device in a first group of processing devices that synchronously process a same current task and perform initialization, wherein the initialization setting comprises setting a value of a counting semaphore of a current multi-core synchronous processing unit to M and setting content of a control message for the current multi-core synchronous processing unit to enable a second group of processing devices, and wherein M is the number of times that the first group of processing devices synchronously process the current task;
   a processing module configured to receive a notification message sent by any processing device in the first group of processing devices and subtract one accordingly from the value of the counting semaphore, wherein content of the notification message is that a processing device sending the notification message completes the current task; and
   a sending module configured to, when the value of the counting semaphore is zero, send the control message to the second group of processing devices through a message sending interface according to the set content of the control message for the current multi-core synchronous processing unit to enable the second group of processing devices such that the second group of processing devices processes the current task, wherein the initializing module comprises:

a first receiving submodule configured to receive, through any channel of an internal cache, the initialization setting sent by any processing device in the first group of processing devices that synchronously process the same current task; and an updating and storage submodule configured to read the internal cache corresponding to the channel, update content in the internal cache to the initialization setting, and save the initialization setting, and wherein the processing module comprises:

a second receiving submodule configured to receive, through any channel of the internal cache, the notification message sent by any processing device in the first group of processing devices:

an acquiring submodule configured to read the internal cache corresponding to the channel and acquire a current value of the counting semaphore in the internal cache; and an updating submodule configured to subtract one from the current value of the counting semaphore and save the current value of the counting semaphore in the internal cache.

3. The apparatus for synchronous processing based on the multi-core system according to claim 2, wherein the multi-core synchronous processing unit comprises a semaphore direct acquiring unit, a semaphore indirect acquiring unit, a message sending unit, and a semaphore threshold counting unit, wherein the semaphore direct acquiring unit is configured to directly send an acquisition identifier to a processing device that acquires a semaphore, wherein the semaphore indirect acquiring unit is configured to send an acquisition identifier to a processing device by sending a message or sending an interrupt, wherein the message sending unit is configured to send a control message or a notification message to a processing device through a message sending interface, and wherein the semaphore threshold counting unit is configured to control counting semaphores acquired by processing devices concurrently accessing the multi-core synchronous processing unit.

* * * * *